M. COTTON.
LAMP.
APPLICATION FILED JAN. 24, 1913.
1,071,550.
Patented Aug. 26, 1913.
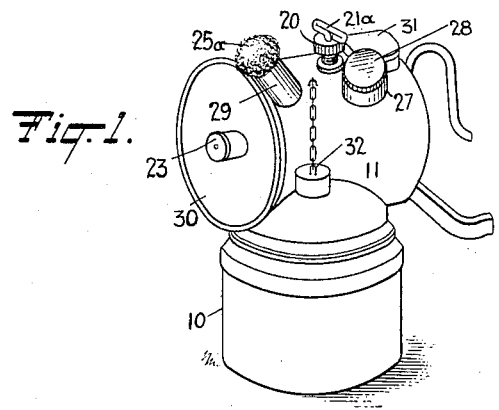
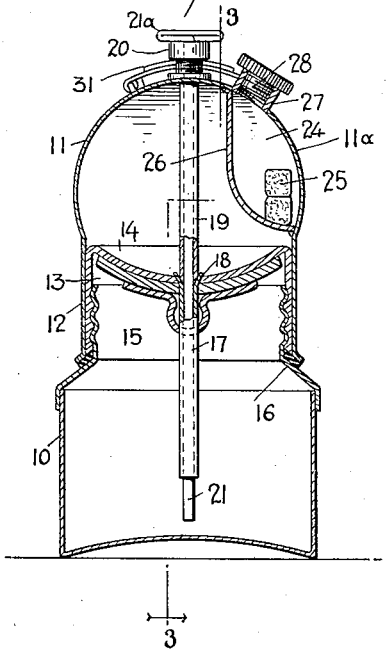
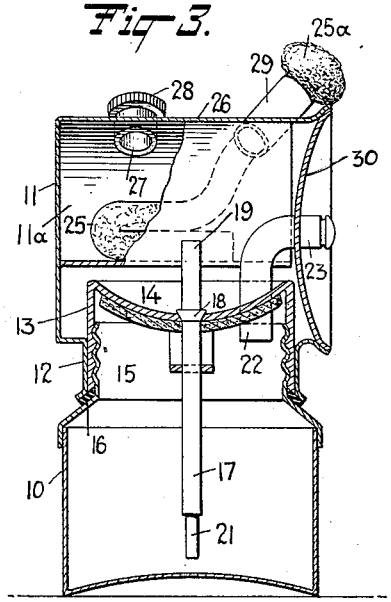
WITNESSES
George Bambay
INVENTOR
MICHAEL COTTON
BY
ATTORNEYS

UNITED STATES PATENT OFFICE.

MICHAEL COTTON, OF CLINTON, INDIANA.

LAMP.

1,071,550.	Specification of Letters Patent.	Patented Aug. 26, 1913.

Application filed January 24, 1913. Serial No. 743,958.

*To all whom it may concern:*

Be it known that I, MICHAEL COTTON, a citizen of the United States, and a resident of Clinton, in the county of Vermilion and State of Indiana, have invented a new and Improved Lamp, of which the following is a full, clear, and exact description.

My invention relates to miners' lamps, and is more particularly intended for embodiment in a miner's lamp burning acetylene gas generated in the lamp.

An object of my invention is to provide a combination lamp employing, in connection with the main lamp, an auxiliary lamp designed to be temporarily lighted in emergencies, to furnish illumination while adjusting, recharging with carbid or water, or otherwise giving necessary attention to the main lamp.

A further object of the invention is to provide a combination lamp comprising a main and an auxiliary lamp having a common base, consisting of the carbid holder and generator of the main lamp.

A further object of the invention is to arrange the elements of the auxiliary lamp so that they are supported upon and by the water reservoir of the main lamp, so that the total dimensions are either not increased or not materially increased.

The invention also has for its object to provide an auxiliary lamp comprising an exterior wick tube so formed and disposed relatively to the burner of the main lamp, that said burner will be illuminated by the auxiliary lamp in order that the burner may be examined should the main light be extinguished, and so that either lamp may be lighted by the other, which is highly desirable in case the user is without a match.

The invention will be particularly explained in the specific description hereinafter to be given.

Reference is to be had to the accompanying drawings forming a part of this specification, in which similar characters of reference indicate corresponding parts in all the views.

Figure 1 is a perspective view of the lamp embodying my invention; Fig. 2 is a transverse vertical section; and Fig. 3 is a longitudinal vertical section approximately on the line 3—3 of Fig. 2.

The essential elements of the main lamp illustrated are of known form, comprising a hollow base 10, forming the carbid holder and gas generator, and a water reservoir 11 in the form of a horizontally disposed cylindrical container supported on the base 10, the said reservoir having a depending annular flange 12, within which is fitted the depending flange 13 of a cup 14 disposed near the bottom of the water reservoir, the flange 13 being threaded to receive the threaded neck 15 on the base 10, and there being in practice, a gasket 16 at the base of the neck 15, on the outside, to insure a watertight connection. The illustrated lamp includes also the usual means for the regulated supply of water from the reservoir 11 to the interior of the carbid holding base 10, for the generation of acetylene gas. Thus a vertical tube 17 extends from the cup 14 into the carbid chamber, and is formed with a flaring upper end 18, into which the lower end of a tube 19 extends, said tube 19 having its upper end 20 adjustably suspended from the top of the reservoir 11, to regulate the space for the inlet of water between the lower end of the tube 19 and the flared upper end 18 of the tube 17. I prefer also to employ the spindle 21 which is removably fitted in the tubes 19 and 17, for preventing the clogging of said tubes, said spindle having any convenient form of head or handle 21$^a$, at the top, to rest on the head 20 of the tube 19.

The gas service pipe 22 extends as usual from the upper portion of the carbid chamber upwardly and outwardly to the front of the reservoir 11, and is provided at the exterior of the lamp with any approved burner 23.

To provide the auxiliary lamp a wick container is produced, which may be of any preferred form so that it does not appreciably increase the external dimensions of the device. I have shown the wick holder in the form of a chamber 24, to receive an ordinary wick 25, the chamber being formed in the illustrated example by means of a partition 26 adjacent to one side wall portion 11$^a$ of the reservoir 11, the chamber 24 being isolated from the interior water space of the said reservoir. In practice it is essential only that the wick holder have a capacity to accommodate the wick saturated with illuminating oil, or other fluid illuminant, it not being absolutely necessary, and possibly undesirable, that there be surplus oil in the wick holder, since the auxiliary lamp will be required to be lighted only temporarily and for a brief period while adjusting or recharging the main lamp. To saturate the wick, oil or its equivalent may be supplied to the wick holder 24 through an inlet 27, preferably closed by a knurled, threaded plug 28.

A wick tube 29 communicates at its inner end with the wick holder 24 and extends exteriorly of the lamp at the upper side of the reservoir 11, and is inclined forwardly toward the front of the lamp to a point about in line with the base of the burner 23, so that the outer exposed end 25$^a$ of the wick 25 may be made to overhang the reflector 30, constituting the front of the reservoir 11. The water inlet to the reservoir 11 has the usual closure 31. Any suitable cap 32 serves to close the wick tube when the auxiliary lamp is not lighted.

With the described arrangement the wick 25$^a$ may be drawn out sufficiently to permit it to be brought toward the burner 23, or in such juxtaposition that the lighted auxiliary lamp may be caused to light the burner 23, or vice versa. Even without extending the wick to bring it closer to the burner 23, it is possible by the user blowing the fumes of gas from the wick toward the burner, or vice versa, to cause the one to light the other, this owing to the relative positions of the wick tube 29 and the burner 23. Moreover, the location of the burner tube results in the auxiliary lamp illuminating the fittings at the top of the main lamp, and illuminates the burner 23, should the latter be clogged, and thus my invention provides a very useful accessory to a miner's equipment. The elements composing the auxiliary lamp involve a trifling cost and the described construction provides compactness, very desirable in a device of this character.

Having thus described my invention, I claim as new, and desire to secure by Letters Patent:

1. A miner's lamp, comprising a carbid holder having a threaded neck, a horizontally disposed cylindrical water reservoir provided with a depending flange and an oil compartment in one side, a cup in the lower portion of the reservoir and having an internally threaded depending flange upon which the flange of the reservoir is secured and into which the neck of the holder screws, a tube leading from the holder through said cup into the reservoir, means for controlling the admission of water to said tubes from the outside of the reservoir, a service pipe leading from the holder through the cup and one end of the reservoir and provided with a burner, and a wick tube leading from the oil compartment out through the top of the same, said wick tube being inclined and having its end terminating adjacent to the end of the reservoir from which the burner projects.

2. A miner's lamp, comprising a carbid holder, a horizontally disposed cylindrical water reservoir mounted upon the holder and having a reflector forming one end of the reservoir, a cup in the lower portion of the reservoir, a tube leading from the holder through the cup into the reservoir, means for controlling the admission of water into the tube, from the outside of the reservoir, a service pipe leading from the holder through the cup and reflector and provided with a burner, an oil compartment in the reservoir, and a wick tube extending from the oil compartment above the top of the reservoir, said tube being inclined and having its end terminating adjacent to the end of the reservoir formed as a reflector.

3. A miner's lamp, comprising a carbid holder, a water reservoir mounted on the holder and having a reflector forming a wall thereof, means for supplying water to the holder from the reservoir, a service tube leading from the holder through the reflector and provided with a burner, an oil compartment in the reservoir, and a wick tube extending from the oil compartment above the top of the reservoir and having its end terminating adjacent to the wall of the reservoir formed as a reflector.

In testimony whereof I have signed my name to this specification in the presence of two subscribing witnesses.

MICHAEL COTTON.

Witnesses:
E. A. EVANS,
J. P. TUTWILER.

---

Copies of this patent may be obtained for five cents each, by addressing the "Commissioner of Patents, Washington, D. C."